(12) United States Patent
Niles et al.

(10) Patent No.: US 7,330,960 B2
(45) Date of Patent: Feb. 12, 2008

(54) DYNAMIC ALLOCATION OF COMPUTER MEMORY

(75) Inventors: Ronald Steven Niles, Teaneck, NJ (US); Larry Louie, Flushing, NY (US)

(73) Assignee: FalconStor, Inc., Melville, NY (US)

( * ) Notice: Subject to any disclaimer, the term of this patent is extended or adjusted under 35 U.S.C. 154(b) by 0 days.

(21) Appl. No.: 11/446,610

(22) Filed: Jun. 5, 2006

(65) Prior Publication Data
US 2006/0236064 A1  Oct. 19, 2006

Related U.S. Application Data (63) Continuation of application No. 10/052,208, filed on Jan. 17, 2002, now Pat. No. 7,058,788.

(51) Int. Cl.
*G06F 12/00* (2006.01)
(52) U.S. Cl. ............ 711/209; 711/170; 711/200; 711/202; 711/203; 711/208
(58) Field of Classification Search ............ None
See application file for complete search history.

(56) References Cited

U.S. PATENT DOCUMENTS

| | | |
|---|---|---|
| 5,206,946 A | 4/1993 | Brunk |
| 5,237,695 A | 8/1993 | Skokan et al. |
| 5,274,783 A | 12/1993 | House et al. |
| 5,287,537 A | 2/1994 | Newmark et al. |
| 5,319,627 A | 6/1994 | Shinno et al. |
| 5,325,527 A | 6/1994 | Cwikowski et al. |
| 5,333,277 A | 7/1994 | Searls |
| 5,388,243 A | 2/1995 | Glider et al. |
| 5,463,772 A | 10/1995 | Thompson et al. |
| 5,471,634 A | 11/1995 | Giorgio et al. |
| 5,491,812 A | 2/1996 | Pisello et al. |
| 5,504,757 A | 4/1996 | Cook et al. |
| 5,524,175 A | 6/1996 | Sato et al. |
| 5,528,765 A | 6/1996 | Milligan |
| 5,548,731 A | 8/1996 | Chang et al. |
| 5,548,783 A | 8/1996 | Jones et al. |

(Continued)

OTHER PUBLICATIONS

"Intel 80389 Programmer's Reference", 1986 available online at http://library.n0i.net/hardware/intel80386 Chapters 5 and 6.

(Continued)

*Primary Examiner*—Jasmine Song
(74) *Attorney, Agent, or Firm*—Brandon N. Sklar; Jonathan Tyler; Kaye Scholer LLP (57) ABSTRACT

In one embodiment, a method is provided for storing data in a physical storage having at least one portion of unused memory, comprising maintaining a first list comprising one or more records associated with respective segments within the unused memory, and receiving a request to store data in at least one logical storage sector associated with the physical storage. A record associated with a segment of the unused memory in which at least some of the data is to be stored is selected from the first list, and the record is updated to include an identifier of the at least one logical storage sector. The record is stored in a second list that associates respective segments with respective logical storage sectors.

39 Claims, 8 Drawing Sheets

U.S. PATENT DOCUMENTS

| | | | |
|---|---|---|---|
| 5,561,812 A | | 10/1996 | Ravaux et al. |
| 5,566,331 A | | 10/1996 | Irwin, Jr. et al. |
| 5,574,861 A | | 11/1996 | Lorvig et al. |
| 5,574,862 A | | 11/1996 | Marianetti |
| 5,596,723 A | | 1/1997 | Romohr |
| 5,613,160 A | | 3/1997 | Kraslavsky et al. |
| 5,640,541 A | | 6/1997 | Bartram et al. |
| 5,664,221 A | | 9/1997 | Amberg et al. |
| 5,739,519 A | | 4/1998 | Tsuchiya |
| 5,787,019 A | | 7/1998 | Knight et al. |
| 5,819,054 A | | 10/1998 | Ninomiya et al. |
| 5,835,694 A | * | 11/1998 | Hodges ........................ 714/6 |
| 5,892,955 A | | 4/1999 | Ofer |
| 5,923,850 A | | 7/1999 | Barroux |
| 5,925,119 A | | 7/1999 | Maroney |
| 5,941,972 A | | 8/1999 | Hoese et al. |
| 5,963,983 A | | 10/1999 | Sakakura et al. |
| 5,991,813 A | | 11/1999 | Zarrow |
| 5,996,024 A | | 11/1999 | Blumenau |
| 6,003,065 A | | 12/1999 | Yan et al. |
| 6,041,381 A | | 3/2000 | Hoese |
| 6,188,997 B1 | | 2/2001 | Ratzenberger, Jr. et al. |
| 6,195,767 B1 | * | 2/2001 | Adams ........................ 714/47 |
| 6,263,445 B1 | | 7/2001 | Blumenau |
| 6,516,400 B1 | * | 2/2003 | Suzuki ........................ 711/209 |
| 6,529,995 B1 | * | 3/2003 | Shepherd ..................... 711/114 |
| 6,745,207 B2 | | 6/2004 | Reuter et al. |
| 6,804,819 B1 | | 10/2004 | Bates et al. |
| 6,857,059 B2 | | 2/2005 | Karpoff et al. |
| 6,947,332 B2 | | 9/2005 | Wallace et al. |
| 2002/0161983 A1 | | 10/2002 | Milos et al. |
| 2003/0084241 A1 | * | 5/2003 | Lubbers et al. .............. 711/114 |

OTHER PUBLICATIONS

Klien, R.-D, and Thiel, T., "SCSI- adapter for hard disks. Part 3,: BIOS", Mikrocomputer Zeitchrift No. 12, pp. 88-98, 102-5, publ. Dec. 1989.

Putnam, T., "General host interface for SCSI applications", Opticalinfo 89. The International Meeting for Optical Publishing and Storage, pp. 99-105, publ. Learned Information, Oxford, UK, 1989.

"Automatic Small Computer System Interface Termination Circuit for Narrow/Wide Devices on Wide Bus", IBM Technical Disclosure Bulletin, pp. 79-82, Apr. 1997.

"Transparent Target Mode for a Small Computer System Interface", IBM Technical Disclosure Bulletin, pp. 161-164, Aug. 1990.

"Automatic Target Mode for the Small Computer System Interface", IBM Technical Disclosure Bulletin, pp. 130-133, Oct. 1990.

"Method Allowing Small Computer Interface Adapters to Coexist with Other Hardfile Adapters", IBM Technical Disclosure Bulletin, pp. 709-710, Sep. 1994.

"Software Solution for Coordinating a Small Computer System Interface with Multiple Drives", IBM Technical Disclosure Bulletin, pp. 577-578, Jun. 1995.

"Multi-Thread Sequencing in a Small Computer Interface Environment", IBM Technical Disclosure Bulletin, pp. 497-500, Sep. 1994.

"SCSI Device Auto-Sensing for On-Board SCSI Interface Sub-System", IBM Technical Disclosure, pp. 395-396, Feb. 1994.

"Small Computer System Interface ID Translation", IBM Technical Disclosure Bulletin, pp. 125-126, Feb. 1994.

"Single-Ended Device to Differential Small Computer System Interface Converter", IBM Technical Disclosure Bulletin, pp. 457-458, Dec. 1993.

"SCSI Multiple Initiator", IBM Disclosure Bulletin, pp. 367-369, Sep. 1992.

"Self Configuring Small Computer System Interface Device Driver", IBM Technical Disclosure Bulletin, pp. 135-142, Mar. 1995.

"Multiple Small Computer System Interface Command Arrangement", IBM Technical Disclosure Bulletin, pp. 613-614, Jan. 1995.

"Real-Time Performance for Small Computer System Interface Disk Arrays", IBM Technical Bulletin, pp. 33-34, Feb. 1996.

"Managing Queue Full Status for Small Computer System Interface, Version 2", IBM Technical Disclosure Bulletin, pp. 247-248, Jul. 1995.

"Small Computer Systems Interface Identification Qualification During Selection/Deselection", IBM Technical Disclosure Bulletin, pp. 209-210, Dec. 1990.

"Suppress Illegal Length Indication on the Small Computer System Interface While Still Detecting Length Errors", IBM Technical Disclosure Bulletin, pp. 316-318, Mar. 1990.

"SCSI-3 Generic Packetized Protocol (SCSI-GPP)", Information Processing Systems Technical Report, (Rev 9, Jan. 12, 1995) publ. 1997 by American National Standards Institute.

"XDR: External Data Representation Standard", Network Working Group, RFC 1014, Sun Microsystems, Inc., Jun. 1987 (http://rfc.net/rfc1014.html).

"Information Technology-SCSI Architecture Model-2 (SAM-2)", T10 Technical Committee, NCITS, Project 1157-D, Revision 14 (Working Draft), Sep. 17, 2000, Distributed by Global Engineering Documents, Englewood, CO.

"Network-attached peripherals (NAP) for HPSS/SIOF", Lawrence Livermore National Laboratory, Oct. 1995 (www.linl.gov/liv.sub.-comp/siof.sub.-nap.html).

Van Meter, R., "A Brief Survey of Current Work on Network Attached Periphals (Extended Abstract)", pp. 63-70, Operating Systems Review, Jan. 1996, ACM Press.

Van Meter, R., "A Brief Survey of Current Work on Network Attached Peripherals", Information Sciences Institute, University of Southern California, Jan. 19, 1996.

Gibson et al., "A Case for Network-Attached Disks", School of Computer Science, Carnegie Mellon University, Sep. 1996.

"Solving Network Storage Problems", Network Storage Solutions Inc., 600 Herndon Parkway, Herndon, VA 22070, (www.networkbuyersguide.com/search/129002.htm), no date.

"Betting On Networked RAID—Who is competing for a piece of the raid market? Carmen Marchionni of OSSI reveals an insider's viewpoint to the market", (www.ossi.net/about/abet.html), Jun. 1996.

Finn, G.F., Hotz S., and Van Meter, R., "NVD Research Issues and Preliminary Models", Finn, USC/Information Sciences Institute, Mar. 1995 (updated Sep. 1, 1995) (www.isi.edu/div7/netstation).

Van Meter, R., "VISA: Netstation's Virtual Internet SCSI Adapter", USC/Information Sciences Institute, Jul. 15, 1997 (slides).

Van Meter, R., Finn, G.F., and Hotz S., "VISA: Netstation's Virtual Internet SCSI Adapter", Information Sciences Institute, University of Southern California, ASPLOS 8, Oct. 1998.

Van Meter, R., Hotz S., and Finn, G.F., "Task Force on Network Storage Architecture: Internet-attached storage devices", University of Southern California/Information Sciences I IEEE, p. 726, publ. in the Proceedings of the Hawaii Intl. Conf. on System Sciences, Jan. 8-10, 1997 Wailea, HI.

Cohen, D., Finn, G., Felderman, R., and Deschon, A., "ATOMIC: A Low-Cost, Very High-Speed, Local Communication Architecture", USC/Information Sciences Institute, 1993 International Conference on Parallel Processing.

Felderman, R., Deschon, A., Cohen, D., and Finn, G., "ATOMIC: A High-Speed Local Communication Architecture", USC/Information Sciences Institute, Journal of High Speed Networks 1 (1994), pp. 1-28, IOS Press.

Cohen, D., Finn, G., Felderman, R., and Deschon, A., "ATOMIC: A Local Communication Network Created Through Repeated Application of Multicomputing Components", University of Southern California/Information Sciences Institute, Oct. 1992.

Finn, G., "An Integration of Network Communication with Workstation Architecture", USC/Information Sciences Institute, Oct. 1991, ACM Computer Communication Review.

Cohen, D., Finn, G., Felderman, R., and Deschon, A., "ATOMIC: A Low-Cost, Very-High-Speed LAN", USC/Information Sciences Institute (no date of publ.) (probably before 1995).

Finn, G., Van Meter, R., Hotz S., Finn, G., and Parham, B., "Interfacing High-Definition Displays via the Internet", USC/Information Sciences Institute, Aug. 1995.

Finn, G., and Mockapetris, P., "Netstation Architecture Multi-Gigabit Workstation Network Fabric", USC/Information Sciences Institute (no date)(probably before 1995).

Finn, G., "Netstation Architecture Gigabit Communication Fabric", USC/Information Sciences Institute, University of Southern California, Apr. 1994, (slidechart/diagrams).

Cohen, D., Finn, G., Felderman, R., and Deschon, A., "The Use of Message-Based Multicomputer Components to Construct Gigabit Networks", USC/Information Sciences Institute, Jun. 1992.

Welch, N., "Transoft polishes SCSI-Net hub; Stalker Ships SCSI-Sharing Tool", MacWeek, Aug. 22, 1994 (News Section).

"SCSIShare/Share that Scanner", p. 71, Nov. 1995, MacUser.

Allen, L., "Stalker Software Announces an Update and a Free Demo of Their Popular SCSIShare Software", Mac Mania News, Jul. 30, 1998.

"IP Storage (ips)", IETF, (updated as of Oct. 2000)(www.ietf.org/html.charters/ips-charter.html).

Elliston, B., "Encapsulating IP with the Small Computer System Interface", Compucat Research, Network Working Group, RFC 2143, May 1997 (http://rfc.net/rfc2143.html).

Elliston, B., "Encapsulating IP Using SCSI", Linux Journal, Aug. 1998 (www2.linuxjournal.com/lj-issues/issue52/2344.html).

Scott, R., Frantz, C., and Bork, A., "IP Encapsulation in SCSI Driver", Feb. 1997 (www.msoe.edu/.about.sebem/courses/cs400/team1/final/index.htm).

Perratore, E., "Networking CD-ROMs—The Power of Shared Access", PC Magazine, Dec. 31, 1991, pp. 333-363.

"EDS and ASI Wireless Team to Provide Industry-First Complete and Secure A-Key Programming Solution", Business Wire, Mar. 31, 1998.

* cited by examiner

DYNAMIC ALLOCATION OF COMPUTER MEMORY

The present application is a continuation of U.S. application Ser. No. 10/052,208, which was filed on Jan. 17, 2002 now U.S. Pat. No. 7,058,788, is assigned to the assignee of the present application, and is incorporated by reference herein in its entirety.

TECHNICAL FIELD

The subject invention relates to a dynamic allocation method that allows computer memory space, such as disk space, to be allocated to a virtual disk on demand rather than having the entire space pre-allocated.

BACKGROUND

Volumes are created on a hard disk by providing parameters to disk creation utilities such as Fdisk on Windows NT or Disk Druid on Linux. The parameters includes information such as partition type, volume name and volume size. The disk utility creates the new volume by allocating the disk space as dictated by the user's given parameters. Therefore if the disk utility is instructed to create a 1 GB volume, 1 GB of disk space will be allocated and reserved for the volume's exclusive use. Once the disk space is allocated, the disk space belongs to that volume, and that volume only, whether data is written to it or not.

This method of creating volumes in which the required disk space must be pre-allocated is not very efficient in terms of cost. From an accounting standpoint, a resource costs less to own and maintain if it is used rather than if the same resource is standing by empty. Unused resources serve no purpose. In terms of storage devices, a large percentage of the disk space will remain unused until users can generate enough data to utilize the entire capacity. An analogy to this inefficiency is similar to creating and stocking large amounts of a product in anticipation of consumers wanting to buy the product. If the product is in great demand, then the necessity of creating and stocking is worth the effort because the product will be consumed very quickly. There is minimal inventory cost to maintain the storage and upkeep of the product. However, if due to the nature of the product, consumers slowly purchase the product over time, the inventory cost in stocking the product is very high. Storage fees will need to be paid to store the product in a warehouse, maintenance fees will need to be paid if the product can deteriorate if a proper environment is not maintained, and the product can lose its usefulness to the consumer if the product "sits on the shelf" for too long. A more efficient model is to create the product as needed and to maintain a very small inventory in the event of a sudden surge in the consumption of the product.

Disk space in a server environment also suffers from the above issues. The consumers are the users on a network who utilizes the disk storage on servers. A volume's disk space is the product that users consume. In general, users do not consume a volume's entire available disk space in a short time, but rather a first amount of disk space is used when the volume is initially created to store their applications and data files, and then the disk space is used in small amounts over an extended period of time as new files are created or as old files grow larger. Data is more likely to be "read from" than "written to" a disk. Therefore large amounts of disk space can remain unused for a long period of time.

An administrator tends to create a volume with much more capacity than is initially required because it is very difficult to predict the exact usage of a volume since disk space usage is very dynamic. New users may be added. Old users and their data may be deleted. Some users may need very little additional storage after their initial applications and data files are stored, while other users may require a large amount of storage in an instant. The administrator must take into account all these factors and will generally over allocate the disk storage.

Veritas' Volume Manager software is capable of expanding the size of a volume, but can only do so manually. An administrator must manually enlarge a volume's capacity by first adding additional physical disk drives and then using the software to configure each volume with the new storage. Since this method is manual, the administrator must add on enough disk space so that he does not need to perform this procedure frequently. Therefore this expansion technique also has the inherent disadvantage of having large amounts of unused disk space over a large period of time.

SUMMARY OF THE INVENTION

In one embodiment, the disk space allocation method of the present invention assigns disk space to a virtual disk drive as needed. In one example, the dynamic allocation technique functions on the drive level. All disk drives that are managed by the dynamic disk space allocation may be defined as virtual drives. The virtual drive system allows an algorithm to manage a disk drive whose physical storage is not all present. Very large disk drives can virtually exist on a system without requiring an initial investment of an entire storage subsystem. Additional storage can thus be added as it is required without committing these resources prematurely.

Unless otherwise stated, any references to "disk drives" and "sectors" refer to their logical, not their physical representation. This means that a logical disk drive can be composed of one or more physical disk drives that are aggregated together to form one large disk drive or one logical drive. Logical sectors may be composed of one or more physical sectors and their logical sector addresses may be different from their physical addresses.

In accordance with one embodiment of the invention, a method is provided for storing data in a physical storage having at least one portion of unused memory, comprising maintaining a first list comprising one or more records associated with respective segments within the unused memory, and receiving a request to store data in at least one logical storage sector associated with the physical storage. The data may be received in a data write request, for example. A record associated with a segment of the unused memory in which at least some of the data is to be stored is selected from the first list, and the record is updated to include an identifier of the at least one logical storage sector. The record is stored in a second list that associates respective segments with respective logical storage sectors. In various examples, the respective segments may have a fixed length, or, alternatively, variable lengths. The second list may comprise a cyclic redundancy code (CRC) checksum.

In one example, a record may comprise a segment descriptor that identifies a respective segment within the unused memory. In various examples, a segment descriptor may comprise an identifier of a home storage device location associated with the segment, an identifier of a physical starting sector of the segment, and/or a segment number.

The method may additionally comprise searching the second list to determine whether the at least one logical storage sector is associated with a respective segment, and determining that the second list does not indicate an association between the at least one logical storage sector and any segment.

In accordance with another embodiment of the invention, a system is provided for storing data in a physical storage having at least one portion of unused memory, comprising storage configured to store a first list comprising one or more records associated with respective segments within the unused memory, and store a second list that associates respective segments with respective logical storage sectors associated with the physical storage. The system also comprises a processor configured to receive a request to store data in at least one of the logical storage sectors, and select from the first list a record associated with a segment of the unused memory in which at least some of the data is to be stored. The processor is further configured to update the record to include an identifier of the at least one logical storage sector, and store the updated record in the second list.

In accordance with another embodiment of the invention, a method is provided for writing data to a memory having physical sector addresses that have not been assigned to logical sector addresses. The method comprises receiving a write command having associated therewith a starting logical sector address, assigning the starting logical sector address to a group of the physical sector addresses, and determining from the group of the physical sector addresses a physical sector address associated with the starting logical sector address. The method further comprises writing data to the physical sector address within the group of the physical sector addresses associated with the starting logical sector address.

In accordance with another embodiment of the invention, a method is provided for processing a data storage request having a starting logical sector address and a sector count to write to a memory, where one or more segments having a predetermined number of logical sector addresses has been allocated and reserved for the memory. The method comprises determining whether the starting logical sector address is within a segment of the one or more segments. If the starting logical sector address is within a segment of the one or more segments, a determination is made to identify the segment that the starting logical sector address is within. A determination is also made as to whether the sector count exceeds the predetermined number of logical sector addresses in the segment that are available. If the sector count does not exceed the predetermined number of logical sector addresses in the segment that are available, one or more write operations are performed to the predetermined number of logical sector addresses in the segment that are available.

DETAILED DESCRIPTION OF THE PREFERRED EMBODIMENTS

Dynamic Allocation Algorithm

The dynamic allocation (DA) algorithm of the present invention does not literally allocate individual disk sectors as they are used, which would be highly inefficient. Instead dynamic allocation of disk space requires a virtual storage device where all the sectors are grouped into larger allocation units called segments, and the DA parcels out segments as they are needed. Within the context of the present invention, generally, a virtual storage device can be any conventional type of computer memory that has been defined by a user of the present invention to have an amount of memory or storage capacity that is greater than the actual physical memory or storage capacity. For example, the virtual storage device can be a device that a server, workstation, or computer, utilizing the device perceives the device as a physical storage unit, where in actuality, the virtual storage device's physical structure can consist of only a portion of a predefined storage unit, portions of many storage units, combinations of many storage units, or even a single storage unit. A software program, called a driver, is used to present a virtual storage device as a single physical device to an operating system. A segment comprises of physical disk sectors, where the number of physical disk sectors in a segment can be one sector or a group of sectors having an upper limit, which is defined by the programmer or by a user. For example, if a virtual storage device has a defined memory capacity of 100 GB of storage and an actual physical memory capacity of less than 100 GB of storage, the virtual storage device is divided into one hundred 1-GB segments. It should be realized that references to a disk(s), or a storage device(s) throughout the detailed description is for nonlimiting illustrative purposes and that other types of memory can be used.

Segments are allocated as needed, such as when data is to be stored on the virtual storage device. The DA uses a free list, shown in FIG. 1, which is illustrated as a table that is used to keep track of all available segments. When a virtual storage device is initially defined, or when additional storage is assigned to the virtual storage device, the memory space (for example, disk space on drives) is divided into segments. Each segment has associated with it segment descriptors, which are stored in the free list table in memory. Generally, a segment descriptor defines the segment it represents; for example, the segment descriptor may define a home storage device location, physical starting sector of the segment, sector count within the segment, and segment number. The free list table includes unused segment descriptors. A segment map is a table that maintains information representing how each segment defines the virtual storage device. More specifically, the segment map provides the logical sector to physical sector mapping of a virtual storage device. Since the DA allocates memory (for example disk space) as needed, the free list table represents an incomplete list of descriptors because the information in the table only represents the storage that is physically available.

Figure 1:
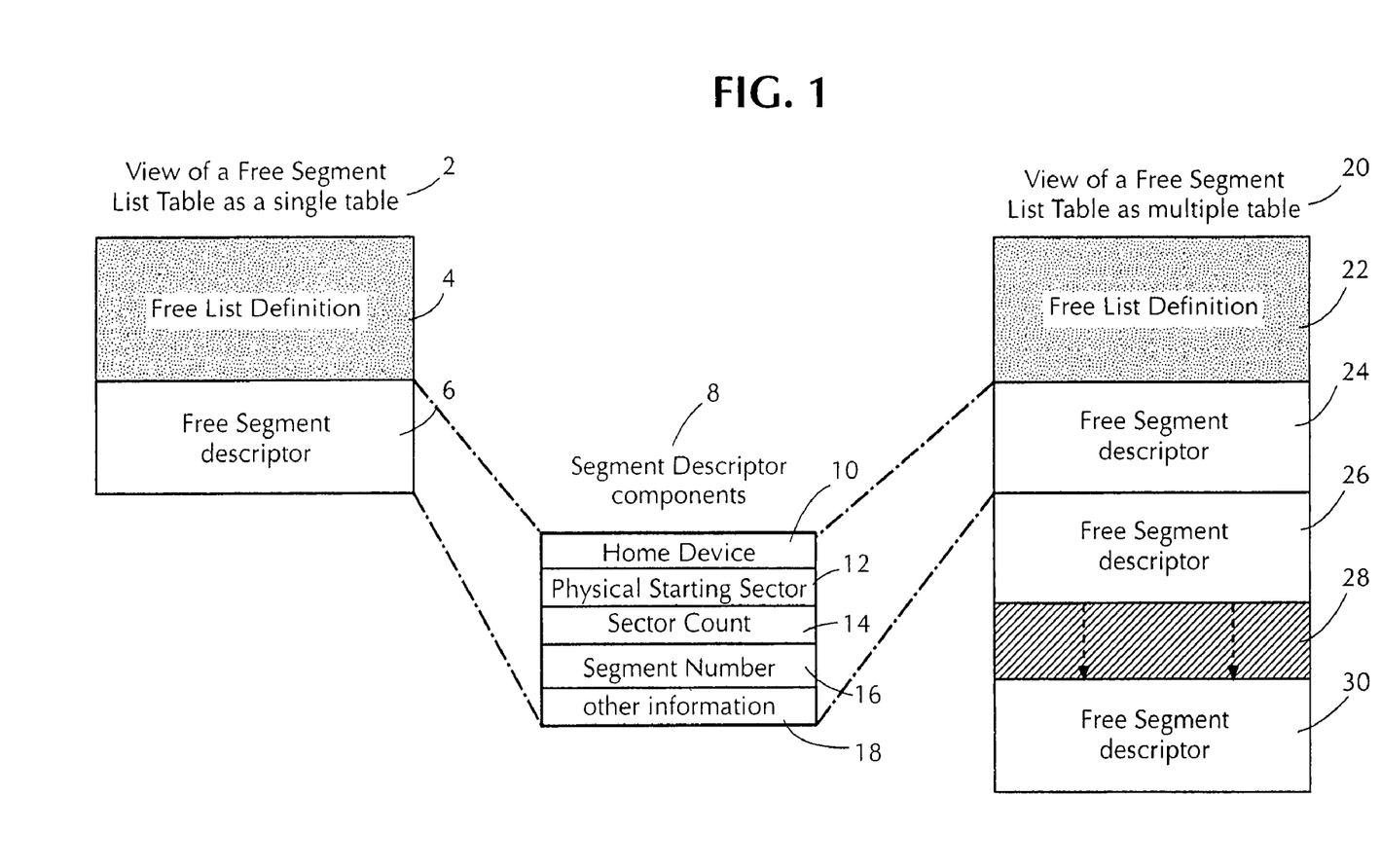
FIG. 1 illustrates a free segment list.

A free list table can be implemented in various ways. For example, if the segments are fixed lengths, the free list table could be a table having only one descriptor 2 that is constantly updated after it is allocated. The reason is that it is easy to calculate the location of the next available segment since the size of each segment is the same. In another example, if the segment size is 100 sectors, the free descriptor will contain information that includes the segment's starting physical address 12, the segment's size (which is 100), and the ID of the device 10 that it resides on. Once the segment descriptor is allocated from the free list 2, a new segment descriptor is created by adding 100 to the starting physical address field 12 and this is now the next free descriptor. Next, a check is performed to verify that the descriptor did not exceed its boundaries on its current physical drive. If the descriptor did not exceed its boundaries, nothing else is done until the descriptors are allocated. If the boundaries were exceeded, three things can happen:

1. It reached the virtual storage device and reached the end of its total capacity, no error is generated and an indicator is set to reflect this status.
2. It reached the end of its allocated disk area on its current physical drive and another physical drive is already available to continue its expansion, the fields in the free descriptor are updated to reflect the new disk. The fields include the starting physical address 12 and device ID 10 fields.
3. It reached the end of its allocated disk area on its current physical drive and no drive is available to continue its expansion. Indicators are set to reflect this status and on the next segment allocation, an error will most likely be generated.

If the segments are variable length, the free list table can contain many descriptors where the segment length field of each descriptor can contain a different number in the free list 20, shown in FIG. 1. The method of determining each segment length is based on the problem that it was intended to solve. For example, in many situations designs that require a variable segment length scheme involve using a series of repeating numbers, such as 2, 4, 6, 8 and then repeats, or is based on an equation that determines a segment length based on current conditions. However the rules on the handling of boundary conditions are the same as the fixed length method.

Figure 2:
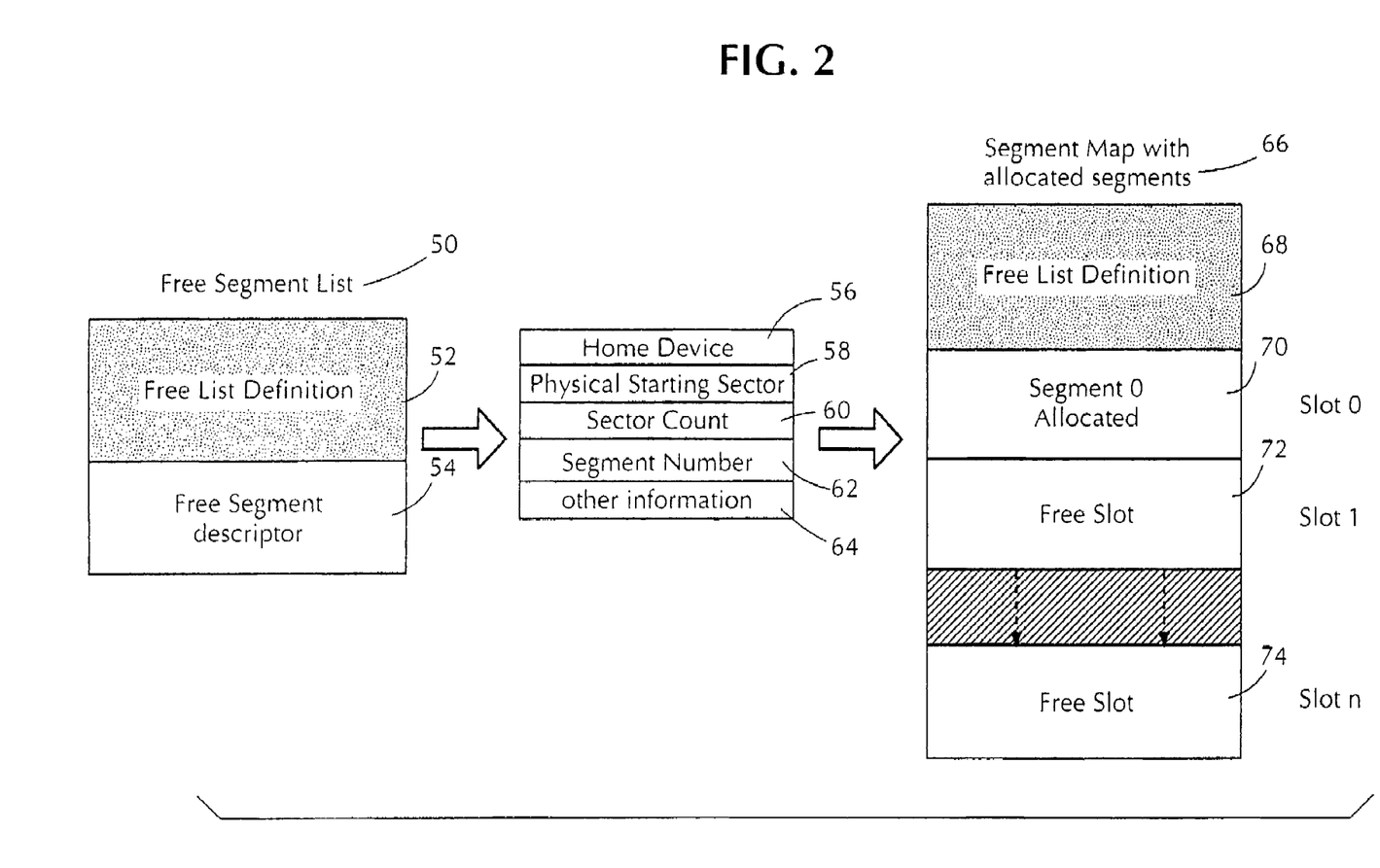
FIG. 2 illustrates relationships between a free segment list and segment map.

Referring to FIG. 2, as segments are needed the next available segment descriptor 54 is identified from the free segment list 50 and assigned to a new table called a segment map 66. The segment map 66 stores the information on how the allocated segments define a virtual storage device. A free segment descriptor is pre-initialized with information that defines the actual physical location of the storage area that the segment represents. After the free segment descriptor 54 is moved or stored in the appropriate area in the segment map 66, which in our example is slot 170, the descriptor is no longer a free segment but is now an allocated segment. The descriptor may also be updated with additional information that was not known until it was allocated. Status flags (not shown in diagram) is an example of additional information that may be saved into the descriptor. Status flags are generally bit-wise fields that are used to represent a variety of true/false, valid/invalid, on/off, enabled/disabled, etc, states of particular conditions. Without the segment map, the order of the segments on the virtual storage device will be unknown. As a back up, two or more copies of the segment map can be stored on the disk in different locations to provide redundant copies.

A Cyclic Redundancy Code (CRC) checksum or any type of data validation algorithm can be added to the segment map to enhance the integrity of the data stored in the segment map. Only the segment map that contains data, which matches its CRC can be used. As mentioned above, the segment map provides the logical sector to physical sector mapping of a virtual storage device that is using the DA method. Thus, an inaccurate segment map can cause catastrophic results on a storage device if the incorrect data is read or the data is incorrectly written to the wrong areas due to bad data stored in the segment map. Error detecting codes embedded into segment maps can help to insure the correctness of the maps. Any segment map that contains corrupt data can be replaced with a valid segment map if a duplicate segment map exists.

Figure 3:
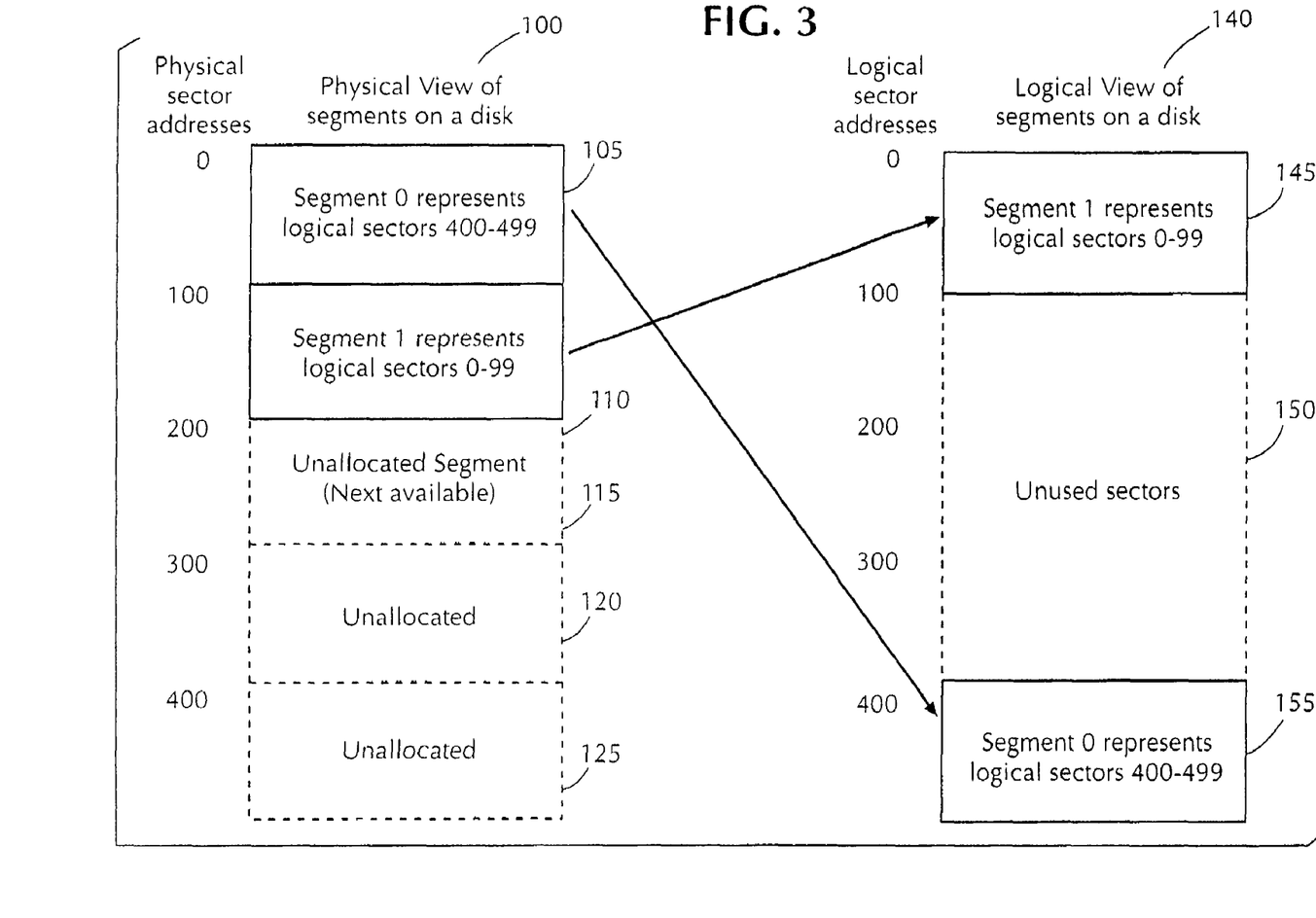
FIG. 3 illustrates relationships between segments and disk sectors.

Segment descriptors are allocated by selecting the next available descriptor and are not dependant on the order of the physical disk sectors of the virtual storage device. Thus, a segment can represent any set of logical sectors on the virtual storage device, such as a logical disk. The logical disk sectors that a segment will represent are defined at the moment the segment is allocated. The reason is that hard disks and similar storage devices are random access; this means that any sectors on a disk can be accessed at any time and in any order. The physical locations of a segment are not related to the locations they represent on a disk. For example, referring to FIG. 3, if each segment represents 100 sectors, the first segment starts with segment 0 and is physically located at physical sector addresses 0-99. If the first sectors to be written start at logical sector address 423, then the DA will allocate Segment 0 105 to represent sectors 400 to 499 155. If the next logical sector to be written starts at sector 1, then the DA will allocate Segment 1 110 as its next available segment and define it to represent logical sector addresses 0-99 145. However, if sector 450 is to be written next, the DA will not allocate a new segment since Segment 0 105 already represents logical sector addresses 400-499 155, and therefore the data will be written to memory within Segment 0 105. To summarize, FIG. 3 shows that logical Segment 0 155 occupies physical sector addresses 0-99 105; logical Segment 1 145 occupies physical sector addresses 100-199 110, etc. Physical Segment 0 105 also represents logical sectors 400-499 155 and physical Segment 1 110 also represents logical sectors 0-99 145.

The DA manages storage devices as a virtual disk, which means that the entire physical disk space does not exist. In other words, the selected or defined memory capacity of the virtual disk may exceed the actual physical memory capacity of the storage device. Only a portion of the virtual disk's selected or defined memory capacity is physically present and thus available in the storage device. If it is required that the actual physical memory capacity be increased, physical storage is added to the system. When new additional physical disk drives are added, their information is stored in a reserved area. This reserved area can be a separate data structure or a data structure that is stored in the header of a free list table and/or segment map. This data structure would contain all the information that is necessary to describe the new drive(s) and how it is linked together with the previous drives. New segment descriptors can be added to the free list or generated as the current segment descriptor. The new disk is segmented and added to a virtual storage device's free list so that the DA can make use of the new space.

Figure 4:
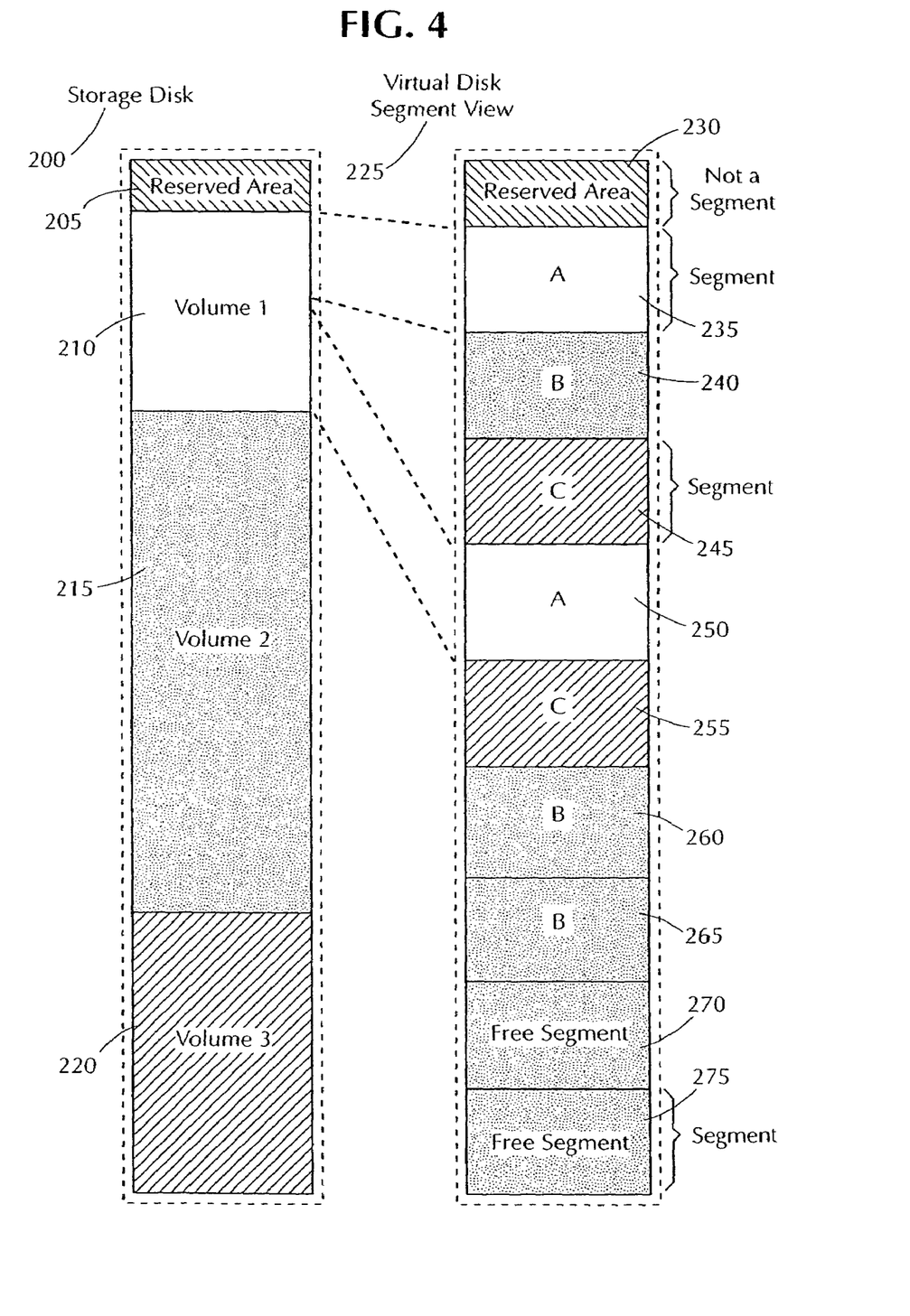
FIG. 4 illustrates relationships between a storage disk and a virtual disk.

The prior art method of defining volumes and allocating their disk space is shown in the left column of FIG. 4, in which a storage device 200 contains three volumes 205, 210, 215 of varying capacities. All of the disk space that will be used is reserved for the volume at the moment that it is created. With the prior art method, if a 1-terabyte volume is required, then a terabyte storage system will need to be physically present when the volume is created. However, with the present invention the DA will not require that the entire 1-terabyte volume be present; instead only a percentage of the volume that is necessary to satisfy the users' initial needs is required. For example, if it is anticipated that a 1-terabyte volume is required for the system, but it would take approximately 6 months to fill 500 MBs of the volume, then the administrator could create the 1-terabyte volume having only 500 MBs of actual physical memory present and add an additional 500 MBs of physical memory or more, when needed.

FIG. 4 shows two views of the same virtual storage disk unit 200 and 225. The first view, illustrating the prior art, is a logical volume view, which shows a virtual storage disk unit 200 that has been partitioned into three virtual volumes 210, 215, and 220. The second view, illustrating the present invention, is a re-illustration of storage unit 200 as storage unit 225 with the same three volumes 210, 215 and 220 as they would look if DA is used. FIG. 4 illustrates the following:

1. The segments 235 and 250 for Volume 1 are completely allocated, and no additional segments are needed.
2. Volume 2 is very large, currently uses segments 240, 260 and 265, and will need one additional segment to reach its maximum size.
3. Volume 3, which uses segments 245 and 255, will also need an additional segment.

By using the DA, free segments such as 270 and 275:
1. Can be used for Volumes 2 and 3 if more disk space is needed.
2. May never be used because Volumes 2 and/or 3 may have reached their maximum capacity of usage. Maximum capacity of usage means that a volume has reached a state where data to be added and data to be deleted have reached equilibrium.
3. Can be used to create a new volume or partition since unused disk space is available.

As show above, the DA manages all of the storage devices as virtual devices since the total physical storage may not exist until the storage is nearly full.

Software Driver

It is impossible to architect all the standards necessary to communicate with every peripheral device currently in existence or peripheral devices that will exist in the future. Therefore all operating systems communicate with their peripheral devices through a special program called a device driver. A driver is a specialized program that provides an interface for the operating system to a particular peripheral device(s). In the present invention, the peripheral devices are storage devices which can include, by nonlimiting example, a single physical drive, or multiple drives connected together, RAID, Rewriteable CDROMs (CDRW) or any kind of read/write random access storage device.

There are two basic classes of device driver: "Block," which is used to read/write large amounts of data and "Character," which is used to process data one byte at a time. An example of a block device driver is the driver, which manages hard disks and CDROMs. A character device driver is the driver, which manages the input from a keyboard. Traditionally, block device drivers are used to manage random access storage devices and therefore any driver referred in this document may be a block driver. However, the dynamic allocation methodology of the present invention can be applied to character drivers also if a character driver is developed to manage storage devices with a need for dynamic storage allocation.

I/O Request Blocks

The most popular operating systems (OS), Windows NT/2000, UNIX, NetWare and Linux, all use a special "data structure" to communicate their storage requests to the device driver. A data structure is a block of memory that has been defined by a device driver architect to store a set of values, which are used to retain data and/or communicate data between programs. A "Storage Request" is a command that the operating system is requesting a driver to perform on a device. The storage request can be a command to write data, to read data, to identify itself, to perform a self-diagnostic, etc. The data structure is known under a variety of different names based on their operating system:
 1. Under Windows NT/2000, this data structure is call an I/O Request Packet (IRP).
 2. Under UNIX and Linux, the data structure is known as buf.
 3. Under NetWare, the data structure is a hacb.

In the past, device drivers were monolithic drivers, singular pieces of software, which interacted directly with the operating system and its peripheral device. Most modern day operating systems use a different architecture to allow device drivers to be layered. This allows drivers to have a specialize functions and these functions can be utilized by drivers from different vendors. Drivers are layered or sandwiched between other drivers such that the driver on top communicates with the operating system, the driver on the bottom communicates directly with the peripheral device and the driver in the middle can provide special features such as compression and encryption of data. This architecture is called "Layered Device Drivers" (LDD).

A SCSI device driver is an example of a special function LDD driver that processes SCSI commands received through a data structure called an SRB. A SRB is similar to the function of an IRP in that it also contains commands such as read/write a disk, identify itself, and to perform self-diagnostics but in terms of SCSI. The driver above the SCSI driver in the LDD will receive an IRP from the OS, which it converts into an SRB; the SCSI driver will receive the SRB, which it will process and send its request to a lower device driver in the LDD. The relevance of the SRB is to make it known that storage requests do not have to come directly from the OS; they can also be received from other device drivers. As operating systems and their device drivers continue to evolve, the storage request structures will also evolve.

"IRP" as used herein refers to any storage request data structure or any data structure that is used to communicate similar information. IRPs are used to communicate storage requests/commands from the OS to a driver so that the data can be read from or written to the storage device. Among the information contained within an IRP are the starting sector address, sector counts (the number of contiguous sectors to read or write beginning with the start sector address), and the identifier for the destination storage device (one device driver is capable of managing one or more storage devices). The OS dictates where and how much data will be written or read to the device driver. However, since a device driver is the actual controller of the device, it can alter where and how the data will be written or read. Due to the high-level command architecture of the OS, the actual physical location of the data is not relevant as long as the OS commands are fulfilled.

A software driver is used to manage the dynamic allocation process. The software driver can be a monolithic driver, a layered driver, or a driver based on some other architecture, as long as the driver can receive the sector address and device information. The driver will receive IRPs from the operating system and analyze the sector addresses to determine if they lie within an allocated segment. If the segment has been allocated, the driver will perform the requested action on the sectors. If the segment has not been allocated, the driver will retrieve an unallocated segment from its pool of free segments, assign the segment to the device and will then perform the requested action.

Dynamic Allocation of Disk Space

Figure 5:
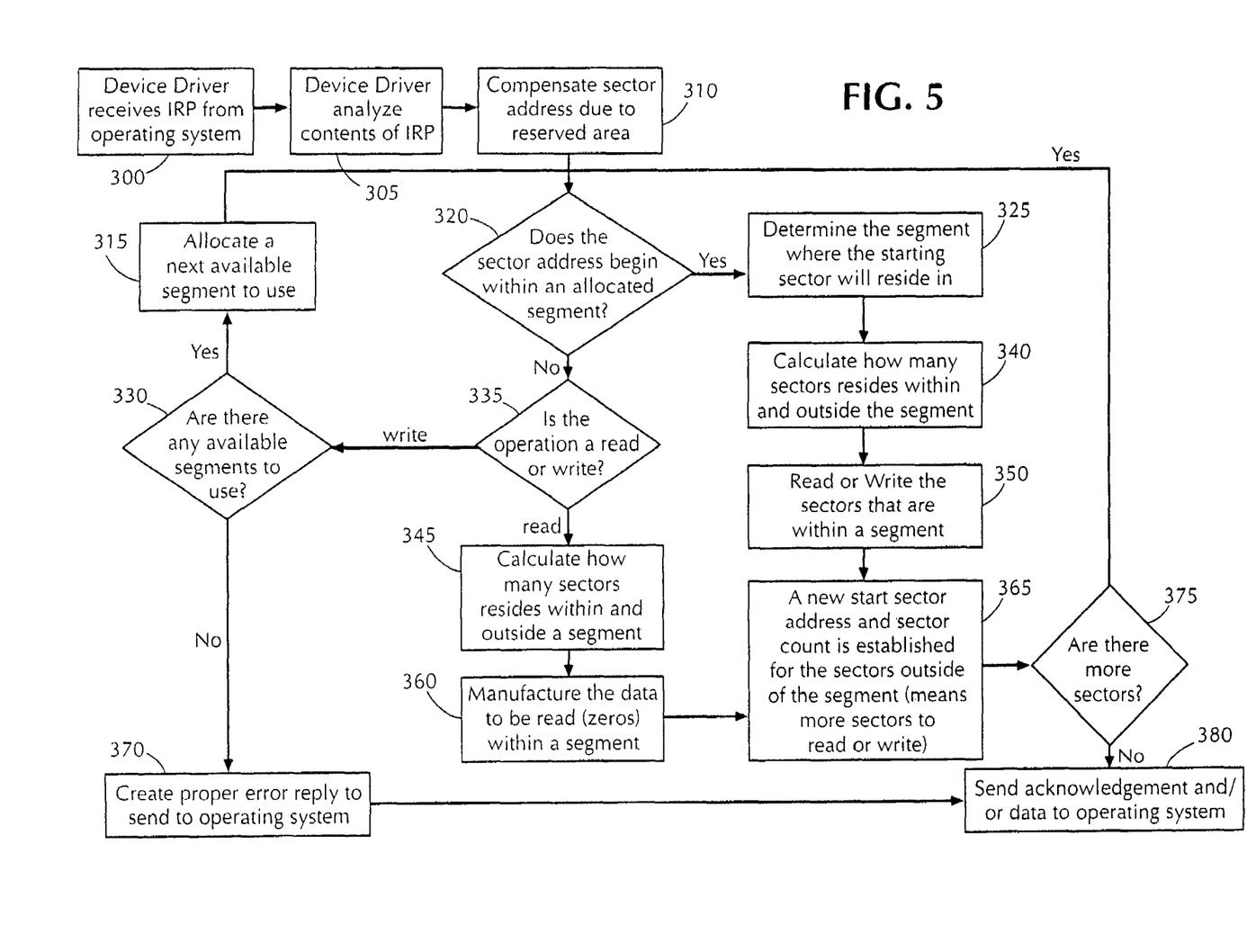
FIG. 5 is a flowchart depicting the steps of dynamically allocating disk space.

A flowchart showing the Dynamic Allocation (DA) of memory space method is shown in FIG. 5. At block 300 the device driver receives an IRP from the operating system. FIG. 5 shows a monolithic device driver. If the device driver is a layered driver, then the driver will receive an IRP from another driver. The IRP's contents are examined at block 305 to determine if the command is a Read or Write. The Read and Write commands are used as representative examples. Other commands may exist which will also need to be processed through the dynamic allocation algorithm, but their steps will just be a variation of the same steps used by the Read and Write commands and thus need not be detailed herein.

Besides examining the commands, the sector addresses and destination device identifier are also analyzed. If the destination device is not using dynamic allocation, then the Read/Write command is redirected to the normal paths of execution (not shown). A reserved area may exist on the disk, which is generally an exclusive storage area for the device driver to store information about the segments and the storage disk. The sector address will be adjusted to compensate for this reserved area at block 310. The existence of the reserved area is dependent on the algorithm's implementation. The sector address is next examined to determine if it begins within an allocated segment at block 320.

If Sectors to Read/Write are Within an Allocated Segment:

If the sector to read/write is within an allocated segment, the segment is located, and the given logical sector address is converted to a physical sector address that is relative to the segment's location within the disk. This is called the "starting sector." The starting sector is the first sector of a contiguous range of sectors that the driver was requested to read/write by the operating system (provided that more than one sector was requested), and is located at block 325. The algorithm must next determine how many of the requested sectors reside within the allocated segment at block 340. The operating system is unaware that the dynamic allocation driver has organized the disk sectors into dynamic allocation segments. A sector range can be requested to read or write where the data can reside in two separate segments. The algorithm will determine how many sectors reside within the segment at block 340 and will read/write the data at block 350 into the segment. A new starting sector address and sector count is calculated at block 365 to represent any additional data that needs to read/written in another segment. If there are additional sectors to be read/written, at block 375 the algorithm will perform the same steps again against the new starting address and sector count (back to block 320). If no additional data is needed, the driver will send the necessary acknowledgments and requested data to the operating system to signal that the requested operation has been completed at block 380.

If Sectors to Read/Write are not Within an Allocated Segment:

Segments are allocated for write operations only because written data requires actual disk space in order to record their information. Segments are not allocated for read operations because a read operation on sectors in an unallocated segment does not contain any valid data. No valid data exist on the sectors because no data was written to the sectors yet. In order for a sector to have valid information, a sector must be written first before it can be read. Therefore if a sector is read before it is written (unallocated), which may occur, for example, if an image backup program causes reads of an unwritten sector, its data can be manufactured by the driver and returned to the requester (OS or application) thereby saving segments from being unnecessarily allocated. The steps that are taken during Read and Write requests on unallocated segments follow.

In FIG. 5, if the starting sector is not located in an allocated segment at block 320, the algorithm will need to determine if the operation will be a read or write at block 335. If the operation is a Write, a check is made to determine if there are unallocated segments available at block 330, and if available, a segment is allocated at block 315. Then the algorithm will loop back to block 320 where, this time, the starting sector will reside in an allocated segment. The algorithm will then proceed from block 320 as though the segment had always been allocated (i.e., to blocks 325, 340, etc.). If the available segment check has failed at block 330, the algorithm will create the proper error reply at block 370 to the operating system to inform it that the write operation could not be completed.

If the operation was a read at block 335, the algorithm must next calculate how many sectors reside within an unallocated segment at block 345. The operating system may have requested a read operation where the sectors cross two segments. Two scenarios can occur: either one segment is unallocated while the other segment is allocated, or both segments are not allocated. Determination is made at block 345 to determine if the sectors reside within an allocated or unallocated segment, and if the sectors are within an unallocated segment, the required amount of data is manufactured at block 360. Although the manufactured data can be any pattern, the normal practice is to use a pattern of zeros. A new start address and sector count is calculated at block 365 to represent the remaining sectors in the next segment. If there are no additional sectors to be read at block 375, then the algorithm will exit at block 380. The algorithm will proceed back to block 320 to read the remaining sectors if more sectors are to be read at block 375.

Segment Organization

Figure 6:
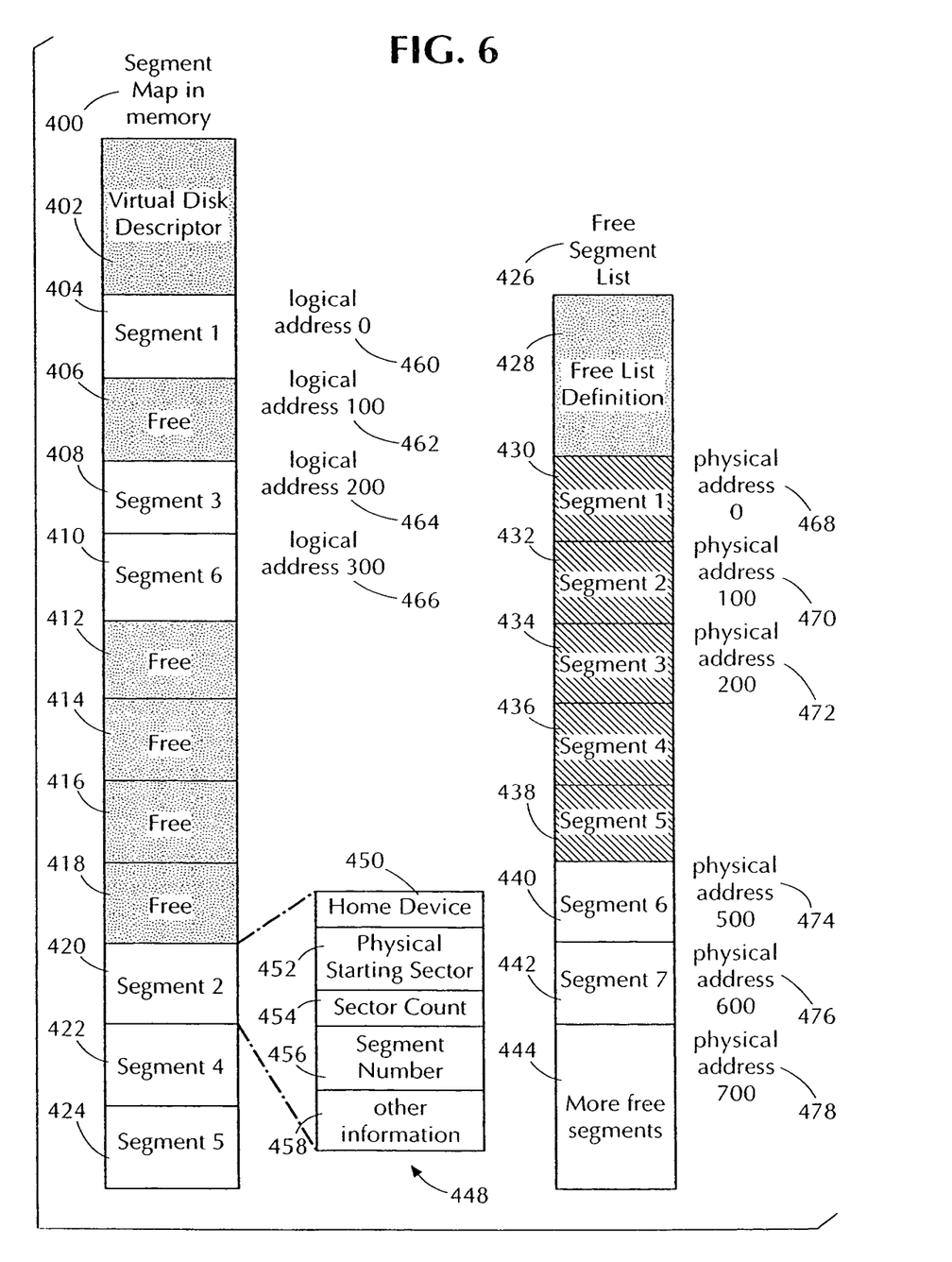
FIG. 6 illustrates relationships between sector addresses and segments.

FIG. 6 illustrates the relationship of sector addresses to their segments. The first left column of FIG. 6 shows a segment map 400 as it would appear once it is stored in a computer's memory from a hard disk during initialization. The free segment list 426 is an illustration of the free list table that was discussed earlier. Free list table 426 is an alternative design that also uses fixed length segments. In this case, the free list table 426 includes many descriptors and is used now for ease of explanation. The segment map is used to quickly determine if a sector address is within an allocated segment and which segment the sectors are located. The segment map 400 begins with a data structure called a "Virtual Disk Descriptor" (VDD) 402 that contains the information that defines the characteristics of a virtual disk. There is one segment map per virtual disk. The VDD 402 is followed by arrays of "Segment Descriptors" (SD)

404-424. SDs are data structures that defines the properties of a segment. The number of SDs 448 is dependent on the size of the virtual disk. If the virtual disk is 100 GB and each SD 448 represents sectors totaling 1 GB, then the Segment Map 400 will have 100 SDs. A sample SD 448 is shown with an excerpt of its contents in FIG. 4. The SD 448 contains the segment's starting address and its range. In most cases, the number of sectors represented by a segment is fixed; this field was added in the event that the segments may represent a variable number of sectors instead of a fixed number of sectors in a future implementation. Variable number (or length) means that each segment descriptor will represent different number of sectors. Fixed length means that each segment descriptor represents the same number of sectors.

The segment map 400 is organized in order of logical sectors as illustrated by 460, 462, 464 and 466. This design provides a quick look up method of determine whether a segment has been allocated when an operation is requested on a sector range. The operating system will request an operation to be performed on a starting sector and range and the algorithm checks if the starting sector falls within an allocated segment or not.

Assume each segment represents 100 sectors as shown in FIG. 6. If the dynamic allocation algorithm receives a write request of sector 315, the algorithm will perform a mathematical calculation to determine which segment descriptor is used to represent sectors 300-399 within the segment map. The calculation will determine that it will be the fourth listed SD 410. Next the dynamic allocation algorithm will determine if SD 410 is a free SD (e.g., 406, 412, 414) or a used SD (e.g., 404, 408, 410). A free SD represents an unallocated segment and a used SD represents an allocated segment.

If SD 410 is a free segment, the dynamic allocation algorithm will get an unallocated segment from the free list 426. According to free list 426 segments 1-5 430-438 have been allocated; the next free segment is Segment 6 440. Segment 6 440 is taken from the free list and is assigned into the segment map. Since the segment map 400 is organized in logical address order, the fourth segment descriptor field 410, which represents logical sectors 300-399, is used. Segment 6, from the free list 426, which reside on physical disk sectors 500-599 574 is made to represent logical sectors 300-399 in the segment map. This is accomplished by storing the starting physical address of the segment into a descriptor's 448 physical starting sector field 452. Therefore, if the logical sectors starting at 315 were to be written, the physical sectors starting at 515 that will actually be written.

If SD 410 is an allocated segment, the dynamic allocation algorithm will read the information stored in the segment descriptor to ascertain where the actual physical address that logical sector 315 should be written. Segment descriptor 448 contains all the information necessary to define the segment. Its data includes the segment's size and the location of the physical sectors that the segment descriptor represents. The home device 450, starting sector 452, and the sector count 454 are three fields in the SD. The home device field 450 is present to handle the event if the virtual disk is a multi-device configuration. It contains all the necessary information to identify the physical devices the segment actually resides on. If the device was a SCSI hard disk, the field may contain a SCSI ID, Logical Unit Number (LUN), and a controller ID (that identifies the controller that is operating the hard disk). The Starting Sector 452 and the Sector Count 454 field state where the first physical sector of the segment begins and the number of contiguous sectors that the segment encompasses, respectively.

Figure 7:
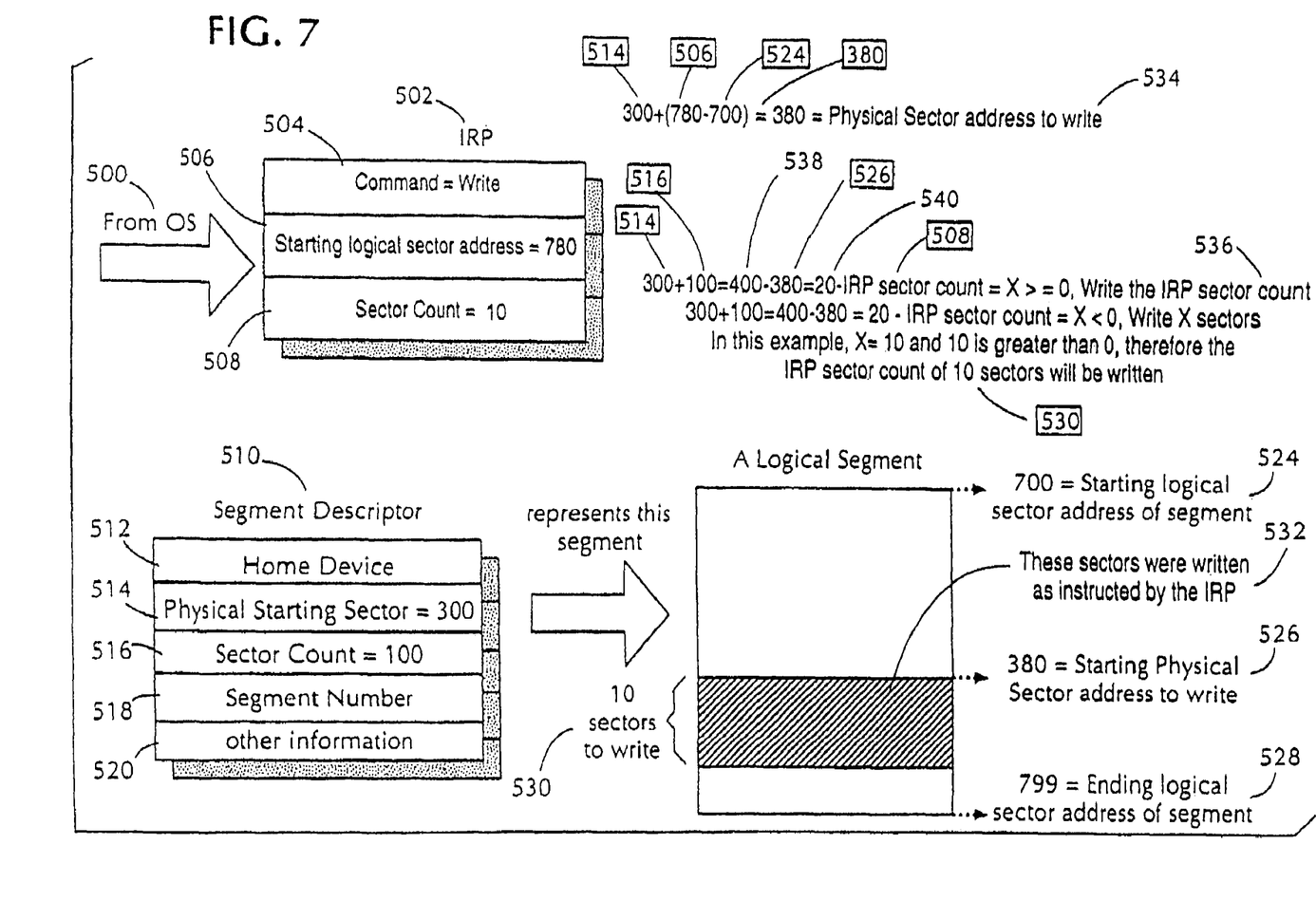
FIG. 7 illustrates an example of writing data to a physical sector of a segment in accordance with the invention.

FIG. 7 illustrates how the data is written to the physical sectors of a segment when an IRP is received. The first action that occurs is that the device driver receives an IRP 502 from the OS 500. An IRP contains all the information necessary for a device driver to complete a requested operation. In the case of a Write operation, the IRP 502 contains a starting logical sector address 506 and the number of sectors to write 508 as well as the command itself 504. The IRP also contains other fields such as a pointer to a memory buffer that contains the data to write but this field and other fields are not shown because they are not necessary for the explanation of the example. The driver receives the IRP and assesses that it is being requested to write data to logical sector 780 and to write 10 logical sectors. Depending on how the device driver was designed to manage the storage device, a logical sector may consist of one or more physical sector. For illustrative, non-limiting purposes only, one logical sector will assume to consist of one physical sector. The device driver uses simple arithmetic as shown in 534 to calculate the physical sector address to write. Since the size of a logical sector is the same as a physical sector, the device driver calculates the difference between the given logical sector to write 506 and starting logical address of the segment 524 it adds it to the starting physical address of the segment 514 to ascertain that the data will be written to physical sector address 380 526. The device driver must next determine how many sectors can be written within this segment. Two or more segments may be required to complete a requested Write operation. The dynamic allocation algorithm is shown in 536, where the difference between the last physical sector address 538 and the starting physical sector address to write 526 is determined to give the number of sectors remaining until the end of the segment 540, and if the remaining sectors are greater or equal to the number of sectors that was requested to write 516, then the given count 516 will be used. In FIG. 5, the requested write operation 502 of 10 sectors 508 will fit within one segment because the remaining sectors of 20 540 is greater than the request of 10 sectors 508. Therefore the data will be written to the sectors 532 starting at physical sector address 380 526 for 10 sectors 530 on the designated device 512.

Figure 8:
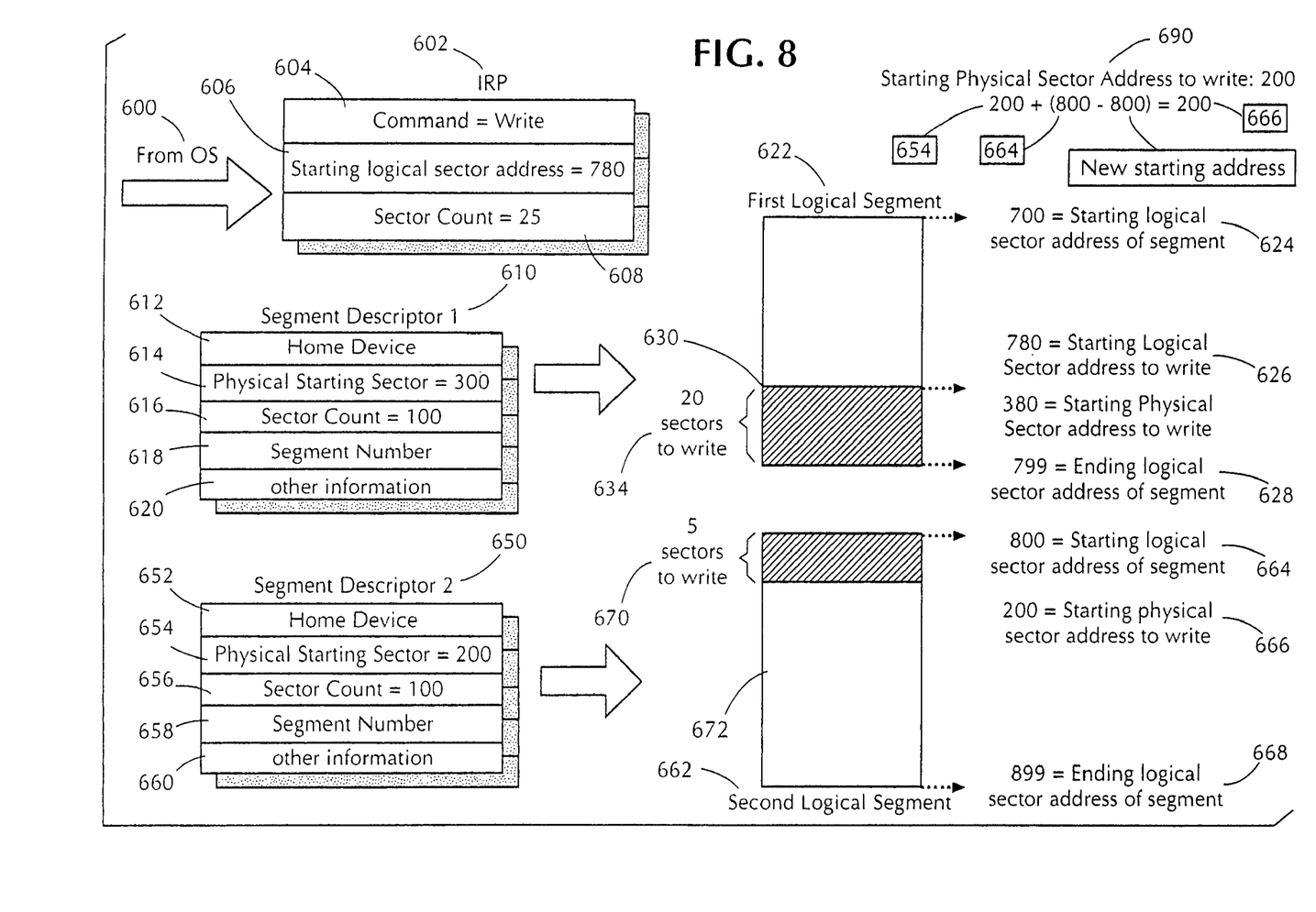
FIG. 8 illustrates an example of writing data to physical sectors spanning two segments in accordance with the invention.

However, if the remaining is less than the given 516, then at least two segments will be used, and the remaining sector count will be used to write to the current segment. FIG. 8 illustrates how a two segment write operation is completed. The example is the same as FIG. 7 except that the sector count is extended to 25 608. The device driver first receives an IRP 600 from the operating system. The driver is instructed to write 604 25 sectors 608 starting at logical sector address 780 606. The driver will determine that the starting sector address is 380 626 by using the calculation explained in FIG. 7. Next, the calculation is made to determine how many sectors can be written with this segment. The calculation (536 of FIG. 7) will show that only 20 sectors can be written until the end of the segment is reached. Therefore only 20 sectors 634 will be written within this segment starting at physical address 380 626 onto the designated device 612. After the data is written to the first segment 622, the driver will then determine where the remaining data will be written by calculating a new starting logical sector address. The driver takes the logical sector address that was written, 780 626, and adds the sectors written 20 634, to locate the new starting logical sector address of 800. The new sector count is 5 since 20 of the requested 25 sectors have already been written. Logical sector 800 is contained within the segment descriptor 650. Segment descriptor 650 represents a segment that starts at physical address 200 654 and consists of 100 sectors 656. The calculation 690 determines that starting physical address of the next segment to begin writing is 200 666. The sector count calculation will show that 5 sectors 670 needs to be written and that all the remaining data can be written within this segment 662. Therefore to complete the requested write operation 602, 5 sectors 670 will be written starting at physical sector address 200 654 onto the designated device 652.

Although the examples in FIG. 7 and FIG. 8 used Write as their requested operation, Reads and any other operations that require accessing the segment will also follow the same general steps.

Management Program

A management program manages the dynamically allocated storage system. A device driver does not have a user interface and cannot initiate any operations on its own. The operating system dictates almost all the operations and activities of a device driver. Special entry points can be coded into a device driver to allow management programs to request operations to be performed and to read status information. These entry points called IOCTLs are legal entry points that are defined in a device driver's architecture to allow programmer-defined operations to take place. Through these entry points, a program can:

1. Create and initialize a storage device to allow dynamic allocation to be used.
2. Monitor when the number of available segments are running low and alert the administrator to add additional storage.
3. Integrate additional storage when new storage devices are added on;
4. Provide diagnostic utilities to test the integrity of the dynamic allocated storage system.
5. Provide utilities such as defragmentation to help enhance the performance of the system.
6. Provide statistical information on the storage system to help the administrator to better manage the system.

The above presents various principles and features of the invention through descriptions of various embodiments. It is understood that skilled artisans can make various changes and modifications to the embodiments without departing from the spirit and scope of this invention, which is defined by the following claims.

We claim:

1. A method for storing data in a physical memory having at least one portion of unused physical memory, comprising:
    maintaining a first list comprising one or more records associated with respective segments within at least one portion of an unused physical memory;
    receiving a request to store data in at least one logical storage sector different from the physical memory;
    selecting from the first list a record associated with at least one segment of the unused physical memory in which at least some of the data is to be stored;
    storing the at least some of the data in the at least one segment of the unused physical memory, instead of in the at least one logical storage sector;
    updating the selected record to include an identifier of the at least one logical storage sector; and
    storing the record in a second list that associates respective segments of the physical memory with respective logical storage sectors.

2. The method of claim 1, comprising:
    receiving the data in a data write request.

3. The method of claim 1, wherein the respective segments have a fixed length.

4. The method of claim 1, wherein the respective segments have variable lengths.

5. The method of claim 1, wherein the second list comprises a cyclic redundancy code (CRC) checksum.

6. The method of claim 1, further comprising:
    searching the second list to determine whether the at least one logical storage sector is associated with a respective segment of the physical memory; and
    determining that the second list does not indicate an association between the at least one logical storage sector and any segment of the physical memory.

7. The method of claim 1, wherein a record comprises a segment descriptor that identifies a respective segment within the unused physical memory.

8. The method of claim 7, wherein a segment descriptor comprises an identifier of a home storage device location associated with the respective segment.

9. The method of claim 7, wherein a segment descriptor comprises an identifier of a physical starting sector of the respective segment.

10. The method of claim 7, wherein a segment descriptor comprises a segment number.

11. A system for storing data in a physical memory having at least one portion of unused physical memory, comprising:
    storage configured to:
        store a first list comprising one or more records associated with respective segments within at least one portion of an unused physical memory; and
        store a second list that associates respective segments of the physical memory with respective logical storage sectors different from the physical memory;
    a processor configured to:
        receive a request to store data in at least one of the logical storage sectors;
        select from the first list a record associated with at least one segment of the unused physical memory in which at least some of the data is to be stored;
        store the at least some of the data in the at least one segment of the unused physical memory, instead of in the at least one logical storage sector;
        update the record to include an identifier of the at least one logical storage sector; and
        store the updated record in the second list.

12. The system of claim 11, wherein the processor is further configured to:
    remove the record from the first list after the record is selected from the first list.

13. The system of claim 11, wherein the processor is configured to: receive the data in a data write request.

14. The system of claim 11, wherein the respective segments have a fixed length.

15. The system of claim 11, wherein the respective segments have variable lengths.

16. The system of claim 11, wherein the second list comprises a cyclic redundancy code (CRC) checksum.

17. The system of claim 11, wherein the processor is further configured to:
    search the second list to determine whether the at least one logical storage sector is associated with a respective segment of the physical memory; and
    determine that the second list does not indicate an association between the at least one logical storage sector and any segment of the physical memory.

18. The system of claim 11, wherein a record comprises a segment descriptor that identifies a respective segment within the unused physical memory.

19. The system of claim 18, wherein a segment descriptor comprises an identifier of a home storage device location associated with the respective segment.

20. The system of claim 18, wherein a segment descriptor comprises an identifier of a physical starting sector of the respective segment.

21. The system of claim 18, wherein a segment descriptor comprises a segment number.

22. A method for writing data to a memory having physical sector addresses that have not been assigned to logical sector addresses, the method comprising:
    defining, within a portion of a memory, a first plurality of blocks, each block comprising at least one range of physical addresses;
    designating, from among the first plurality of blocks, a second plurality of blocks that currently comprise unused memory;
    receiving a write command having associated therewith a starting logical sector address;
    assigning the starting logical sector address to a respective block selected from among the second plurality of designated blocks;
    determining from the selected block a physical sector address associated with the starting logical sector address;
    writing data to the physical sector address associated with the starting logical sector address; and
    removing the selected block from the second plurality of designated blocks.

23. The method of claim 22, further comprising:
    selecting a second block from among the second plurality of designated blocks, if the write command requires writing a quantity of data that exceeds an available amount of unused memory within the selected block; and
    writing data within the second selected block.

24. The method of claim 23, wherein:
    the write command comprises a sector count indicating an amount of data to be written; and
    the second block is selected from among the second plurality of designated blocks, if the sector count exceeds the available amount of unused memory within the selected block.

25. The method of claim 22, wherein the at least one range of physical addresses comprises at least one range of physical sector addresses.

26. The method of claim 22, further comprising:
    receiving a read command having associated therewith a starting logical sector address;
    identifying, from among the first plurality of blocks, a second block associated with the starting logical sector address; and
    reading data from the second block.

27. A method for processing a data processing request, comprising:
    providing to one or more users a virtual storage associated with a physical storage, wherein an amount of memory associated with the virtual storage exceeds an amount of memory associated with the physical storage;
    defining one or more logical segments associated with the virtual storage, each logical segment having a predetermined number of logical sector addresses, including a last logical sector address;
    receiving a request to write data to the virtual storage, the request comprising a starting logical sector address and a sector count; identifying a logical segment associated with the starting logical sector address from among the one or more logical segments;
    determining whether the sector count exceeds a number of logical sector addresses between the starting logical sector address and the last logical sector address in the identified logical segment; and
    if the sector count does not exceed the number of logical sector addresses between the starting logical sector address and the last logical sector address identified logical segment, writing the data to the identified logical segment.

28. The method of claim 27, further comprising:
    if the sector count exceeds the number of logical sector addresses between the starting logical address and the last logical sector address in the identified logical segment:
    writing a first portion of the data to the identified logical segment;
    selecting a second logical segment from among the one or more logical segments; and
    writing a second portion of the data to the second logical segment.

29. The method of claim 27, further comprising:
    identifying a range of physical addresses associated with the identified logical segment, the physical addresses being located within the physical storage; and
    wherein:
    writing the data to the identified logical segment comprises writing the data within the identified range of physical addresses.

30. The method of claim 29, wherein identifying a range of physical addresses associated with the identified logical segment comprises:
    accessing a plurality of descriptors, each representing a range of unused physical addresses within the memory;
    selecting one of the plurality of descriptors; and
    identifying the range of physical addresses represented by the selected descriptor.

31. The method of claim 30, wherein a descriptor comprises a data structure stored in a database.

32. The method of claim 27, wherein the virtual storage comprises one or more volumes created for the one or more users.

33. A method for processing a data processing request, comprising:
    providing to one or more users a virtual storage associated with a physical storage, wherein an amount of memory associated with the virtual storage exceeds an amount of memory associated with the physical storage;
    defining one or more logical segments associated with the virtual storage, each logical segment having a predetermined number of logical sector addresses, including a last logical sector address;
    receiving a request to read data from the virtual storage, the request comprising a starting logical sector address and a sector count;
    identifying a logical segment associated with the starting logical sector address from among the one or more logical segments;
    determining whether the sector count exceeds a number of logical sector addresses between the identified logical sector address and the last logical sector address in the identified logical segment; and reading the data from the identified logical segment, if the sector count does not exceed the number of logical sector addresses between the starting logical sector address and the last logical sector address identified logical segment.

34. The method of claim 33, further comprising:
if the sector count exceeds the number of logical sector addresses between the starting logical address and the last logical sector address in the identified logical segment:
reading a first portion of the data from the identified logical segment;
selecting a second logical segment from among the one or more logical segments; and
reading a second portion of the data from the second logical segment.

35. The method of claim 33, further comprising:
identifying a range of physical addresses associated with the identified logical segment, the physical addresses being located in the physical storage; and
wherein:
reading the data from the identified logical segment comprises reading the data from within the identified range of physical addresses.

36. The method of claim 35, wherein identifying a range of physical addresses associated with the identified logical segment comprises:
accessing a plurality of descriptors, each representing a range of unused physical addresses within the memory;
selecting one of the plurality of descriptors; and
identifying the range of physical addresses represented by the selected descriptor.

37. The method of claim 36, wherein a descriptor comprises a data structure stored in a database.

38. A method for storing data in a storage having at least one portion of unused memory, comprising:
maintaining a first list comprising one or more records associated with respective unused segments within a first memory;
defining a second memory different from the first memory, the second memory comprising one or more storage sectors;
receiving a request to store data, the request specifying at least one unused storage sector of the second memory in which the data is to be stored;
selecting from the first list a record associated with an unused segment of the first memory;
storing the at least some of the data in the unused segment of the first memory;
updating the selected record to include an identifier of the at least one storage sector; and
storing the record in a second list that associates respective segments within the first memory with respective storage sectors.

39. The method of claim 38, wherein:
the first memory comprises at least one physical memory; and
the second memory comprises at least one logical memory.

* * * * *